United States Patent
Hamada

(10) Patent No.: US 12,202,915 B2
(45) Date of Patent: Jan. 21, 2025

(54) POLYETHYLENE POWDER

(71) Applicant: Asahi Kasei Kabushiki Kaisha, Tokyo (JP)

(72) Inventor: Yoshiaki Hamada, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 658 days.

(21) Appl. No.: 17/430,388

(22) PCT Filed: Feb. 17, 2020

(86) PCT No.: PCT/JP2020/006060
§ 371 (c)(1),
(2) Date: Aug. 12, 2021

(87) PCT Pub. No.: WO2020/171017
PCT Pub. Date: Aug. 27, 2020

(65) Prior Publication Data
US 2022/0144981 A1 May 12, 2022

(30) Foreign Application Priority Data
Feb. 20, 2019 (JP) .................... 2019-028209

(51) Int. Cl.
| C08F 110/02 | (2006.01) |
| B01J 2/12 | (2006.01) |
| B29B 9/10 | (2006.01) |
| C08F 10/02 | (2006.01) |
| C08L 23/06 | (2006.01) |

(52) U.S. Cl.
CPC .............. *C08F 110/02* (2013.01); *B01J 2/12* (2013.01); *B29B 9/10* (2013.01); *C08F 10/02* (2013.01); *B29K 2023/06* (2013.01); *C08L 23/06* (2013.01); *C08L 2207/068* (2013.01)

(58) Field of Classification Search
CPC ...... C08F 10/02; C08F 110/02; C08F 210/16; C08F 2500/01; C08F 2500/18; C08L 23/06; C08L 2207/068
See application file for complete search history.

(56) References Cited

U.S. PATENT DOCUMENTS

| 4,246,390 | A * | 1/1981 | Seaver .................... B29C 43/52 |
| | | | 523/307 |
| 10,246,566 | B2 * | 4/2019 | Kikuchi .................... C08J 3/28 |
| 10,336,843 | B2 * | 7/2019 | Hamada .................... D01F 6/30 |
| 2004/0039115 | A1 | 2/2004 | Ishida |
| 2013/0046040 | A1 | 2/2013 | Srinivasan et al. |
| 2014/0004339 | A1 | 1/2014 | Ehlers et al. |
| 2016/0137760 | A1 * | 5/2016 | Kuwata .................... C08F 10/02 |
| | | | 428/402 |
| 2019/0002611 | A1 | 1/2019 | Hamada |
| 2022/0162355 | A1 * | 5/2022 | Tanaka .................. C08F 110/02 |

FOREIGN PATENT DOCUMENTS

| CN | 101654492 A | 2/2010 | |
| CN | 102869688 A | 1/2013 | |
| CN | 103459477 A | 12/2013 | |
| CN | 107438631 A | 12/2017 | |
| EP | 3279225 A1 | 2/2018 | |
| JP | S56-161425 A | 12/1981 | |
| JP | 2007-023171 A | 2/2007 | |
| JP | 4173444 B2 | 10/2008 | |
| JP | 2009-091439 A | 4/2009 | |
| JP | 2015-120784 A | 7/2015 | |
| JP | 2015-140369 A | 8/2015 | |
| JP | 2015-157905 A | 9/2015 | |
| JP | 6195403 B1 | 9/2017 | |
| JP | 2018-016772 A | 2/2018 | |
| JP | 2018-095862 A | 6/2018 | |
| WO | 2012/138995 A2 | 10/2012 | |
| WO | 2014/007765 A1 | 1/2014 | |
| WO | WO-2017163848 A1 * | 9/2017 | ............ C08F 210/16 |
| WO | WO-2019187727 A1 * | 10/2019 | .............. C08F 10/02 |
| WO | WO-2019207991 A1 * | 10/2019 | ............ B29C 43/003 |
| WO | WO-2020189443 A1 * | 9/2020 | ............ C08F 110/02 |

OTHER PUBLICATIONS

International Search Report issued in corresponding International Patent Application No. PCT/JP2020/006060 dated Apr. 21, 2020.
European Search Report issued in corresponding European Patent Application No. 20759908.5 dated Mar. 28, 2022.
International Preliminary Report on Patentability and Written Opinion issued in corresponding International Patent Application No. PCT/JP2020/006060 dated Sep. 2, 2021.

\* cited by examiner

*Primary Examiner* — Rip A Lee
(74) *Attorney, Agent, or Firm* — Morgan, Lewis & Bockius LLP

(57) ABSTRACT

The polyethylene powder has an average particle diameter (D50) of 30 μm or more and 150 μm or less and a powder spreading parameter of 1.5 or more and 2.1 or less.

15 Claims, No Drawings

POLYETHYLENE POWDER

TECHNICAL FIELD

The present invention relates to a polyethylene powder and a molded body formed of the same.

BACKGROUND ART

Since a polyethylene powder, particularly an ultra-high-molecular weight polyethylene powder, has a high molecular weight as compared with general-purpose polyethylene, it is excellent in stretching processability, has high strength, has high chemical stability and is excellent in long-term reliability, conventionally. For these reasons, the polyethylene powder, particularly the ultra-high-molecular weight polyethylene powder, is used as a starting material for molded bodies, such as microporous membranes for separators of secondary batteries typified by a lead storage battery and a lithium-ion battery, and fibers.

The polyethylene powder, particularly the ultra-high-molecular weight polyethylene powder, is excellent in various characteristics, such as impact resistance, abrasion resistance, sliding properties, low-temperature properties and chemical resistance, as compared with general-purpose polyethylene. On that account, the polyethylene powder, particularly the ultra-high-molecular weight polyethylene powder, is also used as a starting material for lining materials for hoppers, chutes and the like, bearings, gears, roller guide rails, or molded bodies such as bone substitutes, bone conductive materials and osteoinductive materials.

In the case of the ultra-high-molecular weight polyethylene powder, extrusion molding of a resin alone is difficult because the molecular weight is high, and therefore, compression molding (press molding) or molding with a special extruder such as a ram extruder is often carried out. It is common to these that making impact resistance and abrasion resistance compatible with each other is important. Examples of methods for making these characteristics compatible with each other are disclosed in, for example, Patent Documents 1 to 3.

LIST OF PRIOR ART DOCUMENTS

Patent Document

Patent Document 1: Japanese Patent Laid-Open No. 2007-23171
Patent Document 2: Japanese Patent No. 4173444
Patent Document 3: Japanese Patent Laid-Open No. 2015-157905

SUMMARY OF INVENTION

Problems to be Solved by Invention

In recent years, demands for enhancement in productivity of various molded bodies using, as a starting material, such a polyethylene powder as described above are increasing.

Specifically, for example, when filling of a polyethylene powder is insufficient in the production of a compression molded body, a decrease in thickness at edge portions of a molded body, occurrence of defects, etc. are brought about, and the strength of the edge portions is lowered, resulting in reduction of yield of the molded body. On the other hand, in order to solve the above problem, there is a method of filling a mold with a large amount of a polyethylene powder in advance, but in the case of, for example, a compression molded body, the polyethylene powder protrudes from the mold, and this amount of the polyethylene powder is wasted, so that not only is it noneconomic but also a time is required for cleaning work of the protruding part, and after all, this leads to deterioration of productivity.

The present invention has been made in the light of the above circumstances, and it is an object of the present invention to provide a polyethylene powder capable of simultaneously achieving improvement in the aforesaid filling failure at edge portions of a molded body and improvement in noneconomic efficiency and deterioration of productivity due to excessive filling of a polyethylene powder, and a molded body formed of the polyethylene powder, in order to enhance productivity of various molded bodies using a polyethylene powder as a starting material.

Means for Solving Problems

Then, in order to solve the above problem, the present inventor has earnestly studied. As a result, the present inventor has surprisingly found that by using a specific polyethylene powder, the above problem can be solved, and the present inventor has completed the present invention.

That is to say, the present invention is as follows.

[1]
A polyethylene powder having an average particle diameter (D50) of 30 μm or more and 150 μm or less and a powder spreading parameter, as defined by the following method, of 1.5 or more and 2.1 or less:

method: when a diameter of a powder pile obtained by allowing 30 g of a polyethylene powder to freely fall from the position of a height of 55 mm on an iron plate with a polyethylene terephthalate film having a thickness of 100 μm placed thereon, using a funnel having a damper at its lower opening in a bulk specific gravity measuring device described in JIS K6720-2 is represented by A, and a diameter of a powder pile obtained after the powder pile having been obtained by allowing 30 g of the polyethylene powder to freely fall is compressed at a pressure of 1 MPa is represented by B, a ratio of B to A (B/A) is defined as a powder spreading parameter.

[2]
The polyethylene powder according to [1], having a viscosity-average molecular weight of 100,000 or more and 10,000,000 or less.

[3]
The polyethylene powder according to [1] or [2], having an apparent density of 0.30 g/mL or more and 0.60 g/mL or less.

[4]
The polyethylene powder according to any one of [1] to [3], wherein a spatula angle of the polyethylene powder is 30 degrees or more and less than 60 degrees, and a difference in spatula angel between before and after collapse (before collapse−after collapse) is 10 degrees or more and less than 25 degrees.

[5]
The polyethylene powder according to any one of [1] to [4], wherein the powder spreading parameter is 1.7 or more and 2.0 or less.

[6]
The polyethylene powder according to any one of [1] to [5], wherein a total of magnesium, titanium and aluminum element contents as measured by an inductively coupled plasma mass spectrometer (ICP/MS) is 20 ppm or less.

[7]
The polyethylene powder according to any one of [1] to [6], having a degree of compression of 20% or less.
[8]
A compression molded body obtained by molding the polyethylene powder according to any one of [1] to [7].
[9]
An extrusion molded body obtained by molding the polyethylene powder according to any one of [1] to [7].
[10]
A stretch molded body obtained by molding the polyethylene powder according to any one of [1] to [7].
[11]
A microporous membrane obtained by molding the polyethylene powder according to any one of [1] to [7].
[12]
A fiber obtained by molding the polyethylene powder according to any one of [1] to [7].

Advantages of Invention

According to the present invention, a polyethylene powder capable of simultaneously achieving improvement in filling failure at edge portions of various molded bodies using a polyethylene powder as a starting material and improvement in noneconomic efficiency and deterioration of productivity due to excessive filling of a polyethylene powder, and a molded body formed of the polyethylene powder can be provided, and it becomes possible to enhance productivity of various molded bodies using the polyethylene powder as a starting material.

Mode for Carrying Out Invention

Hereinafter, an embodiment for carrying out the present invention (referred to as "the present embodiment" hereinafter) will be described in detail, but the present invention is not limited to this and can be variously changed without departing from the scope of the present invention.
(Polyethylene Powder)

The polyethylene powder of the present embodiment has an average particle diameter (D50) of 30 μm or more and 150 μm or less and a powder spreading parameter, as defined by the following method, of 1.5 or more and 2.1 or less. Since the polyethylene powder of the present embodiment satisfies these characteristics, it becomes possible to enhance productivity of various molded bodies using the polyethylene powder as a starting material.

(Method) When a diameter of a powder pile obtained by allowing 30 g of a polyethylene powder to freely fall from the position of a height of 55 mm on an iron plate with a polyethylene terephthalate film having a thickness of 100 μm placed thereon, using a funnel having a damper at its lower opening in a bulk specific gravity measuring device described in JIS K6720-2 is represented by A, and a diameter of a powder pile obtained after the powder pile having been obtained by allowing 30 g of the polyethylene powder to freely fall is compressed at a pressure of 1 MPa is represented by B, a ratio of B to A (B/A) is defined as a powder spreading parameter.

Specifically, the powder spreading parameter can be determined by, for example, the following method.

A funnel having a damper at its lower opening in a bulk specific gravity measuring device described in JIS K6720-2 is used, and the funnel is vertically kept in such a manner that the lower opening is positioned 55 mm above an iron plate of 300 mm square on which a polyethylene terephthalate film having a thickness of 100 μm has been placed. The damper of the lower opening of the funnel is closed, and 30 g of a polyethylene powder is introduced thereinto. The damper is quickly pulled out to allow 30 g of the polyethylene powder to freely fall on the iron plate on which a polyethylene terephthalate film having a thickness of 100 μm has been placed. Diameters (mm) at three points in the largest pile of the polyethylene powder obtained by the free fall (powder not in contact with the pile is not included) are measured, and an average value of them is taken as a diameter A. On the pile, a polyethylene terephthalate film having a thickness of 100 μm is quietly placed, and an iron plate of 300 mm square is further placed thereon. The iron plate having the pile therebetween is quietly introduced in a press machine, and the powder pile is compressed at a pressure of 1 MPa for 5 minutes. The powder pile with the iron plate is quietly taken out, then the iron plate and the polyethylene terephthalate (PET) film placed on the pile are quietly removed, the diameters (mm) at three points in the pile obtained after compression are measured, and an average value of them is taken as a diameter B. In this measurement, the temperature and the humidity in the ambient environment are set to 23° C. and 50 RH %, respectively. A ratio of the diameter B obtained above to the diameter A obtained above (B/A) is defined as the powder spreading parameter (with the proviso that the significant digits are 2 digits).

The thickness of the polyethylene terephthalate film used in the measurement may be 100 μm±5 μm.

The average particle diameter (D50) of the polyethylene powder of the present embodiment is 30 μm or more and 150 μm or less. The average particle diameter (D50) can be measured by a laser diffraction particle size distribution measuring device or the like. Specifically, the average particle diameter can be measured by the method described in the examples described later. The average particle diameter (D50) is preferably 40 μm or more and 140 μm or less, and more preferably 50 μm or more and 130 μm or less. The powder spreading parameter of the polyethylene powder of the present embodiment is 1.5 or more and 2.1 or less, preferably 1.6 or more and 2.1 or less, and more preferably 1.7 or more and 2.0 or less. The powder spreading parameter is thought to be an index of fluidity of the polyethylene powder when an external force such as compression in compression molding is applied. These characteristics of the polyethylene powder of the present embodiment are within the above ranges, and therefore, for example, the polyethylene powder spreads to edges of the mold in the compression molding, therefore insufficient filling at edge portions of a molded body is eliminated, and excessive filling of the polyethylene powder is unnecessary, hence protrusion from the mold is reduced, and consequently, the productivity of the molded body can be enhanced. Thus, it becomes possible to enhance productivity of various molded bodies using the polyethylene powder of the present embodiment as a starting material.

In order that the average particle diameter (D50) and the powder spreading parameter may satisfy the above ranges, for example, reduction of friction between polyethylene powder particles is thought. A method for reducing friction between the polyethylene powder particles is, for example, a method of performing a well-designed heat treatment in the production of the polyethylene powder. Specifically, the method is, for example, a method in which two-stage heat treatment is carried out, mechanical stirring is carried out in the first stage, and the heat treatment temperature in the second stage is set higher than that in the first stage, or a method in which heat treatment is carried out in one stage, but after the heat treatment, a mechanical crushing step is carried out while performing water cooling.

The unit to constitute the polyethylene powder of the present embodiment is not particularly limited as long as the constituent unit is an ethylene unit and/or an ethylene unit and a unit of an α-olefin having 3 or more and 8 or less carbon atoms. The α-olefin having 3 or more and 8 or less carbon atoms, which is copolymerizable with ethylene, is not particularly limited, and is specifically, for example, at least one α-olefin selected from the group consisting of a linear, branched or cyclic α-olefin, a compound represented by the formula: $CH_2=CHR1$ (here, R1 is an aryl group having 1 to 6 carbon atoms), and a linear, branched or cyclic diene having 4 to 7 carbon atoms. Among these, propylene and 1-butene are preferable as the α-olefins from the viewpoints of abrasion resistance, heat resistance and strength of a molded body.

In the present specification, naming of each monomer unit constituting a polymer follows naming of a monomer from which the monomer unit is derived. For example, an "ethylene unit" means a constituent unit of a polymer produced as a result of polymerization of ethylene that is a monomer, and its structure is a molecular structure in which two carbons of ethylene become a polymer main chain. An "α-olefin unit" means a constituent unit of a polymer produced as a result of polymerization of an α-olefin that is a monomer, and its structure is a molecular structure in which two carbons of an olefin derived from the α-olefin become a polymer main chain.

[Viscosity-Average Molecular Weight]

The viscosity-average molecular weight of the polyethylene powder of the present embodiment is preferably 100,000 or more and 10,000,000 or less, more preferably 150,000 or more and 9,500,000 or less, and still more preferably 200,000 or more and 9,000,000 or less. When the viscosity-average molecular weight of the polyethylene powder of the present embodiment is in this range, strength and molding processability of a molded body using the polyethylene powder as a starting material can be made compatible with each other.

The viscosity-average molecular weight (Mv) of the polyethylene powder can be calculated from the following Expression A using an intrinsic viscosity [η] (dL/g) determined by extrapolating reduced viscosities to a concentration 0, the reduced viscosities being determined at 135° C. using solutions obtained by dissolving the polyethylene powder in decahydronaphthalene solutions at different concentrations. In more detail, the viscosity-average molecular weight can be determined by the method described in the examples described later.

$$Mv=(5.34\times10^4)\times[\eta]^{1.49} \quad \text{Expression A}$$

[Apparent Density]

The apparent density of the polyethylene powder of the present embodiment is preferably 0.30 g/mL or more and 0.60 g/mL or less, more preferably 0.33 g/mL or more and 0.57 g/mL or less, and still more preferably 0.35 g/mL or more and 0.55 g/mL or less. When the apparent density of the polyethylene powder of the present embodiment is in this range, handling properties are enhanced, and therefore, protrusion from a mold is reduced, and the deterioration of productivity tends to be able to be improved.

In general, it is possible to control the apparent density by the productivity of the polyethylene powder per unit catalyst though it varies depending on the catalyst used. It is possible to control the apparent density of the polyethylene powder by the polymerization temperature during the polymerization for the polyethylene powder, and by increasing the polymerization temperature, the apparent density thereof can be decreased. It is also possible to control the apparent density of the polyethylene powder by the slurry concentration in the polymerizer, and by increasing the slurry concentration, the apparent density thereof can be increased. The apparent density of the polyethylene powder can be measured by the method described in the examples described later.

[Spatula Angle]

It is preferable that the spatula angle of the polyethylene powder of the present embodiment is 30 degrees or more and less than 60 degrees, and a difference in spatula angel between before and after collapse (before collapse–after collapse) is 10 degrees or more and less than 25 degrees. It is more preferable that the spatula angle is 32 degrees or more and less than 58 degrees, and a difference in spatula angel between before and after collapse (before collapse–after collapse) is 11 degrees or more and less than 23 degrees, and it is still more preferable that the spatula angle is 35 degrees or more and less than 55 degrees, and a difference in spatula angel between before and after collapse (before collapse–after collapse) is 12 degrees or more and less than 21 degrees. When the spatula angle of the polyethylene powder of the present embodiment and the difference in spatula angle between before and after collapse (before collapse–after collapse) are in these ranges, handling properties are enhanced, and therefore, protrusion from a mold is reduced, and the deterioration of productivity tends to be able to be improved. A method for controlling the spatula angle of the polyethylene powder and the difference in spatula angle between before and after collapse (before collapse–after collapse) to the above ranges is, for example, a method of performing a well-designed heat treatment of the polyethylene powder. Specifically, the method is, for example, a method in which two-stage heat treatment is carried out, mechanical stirring is carried out in the first stage, and the heat treatment temperature in the second stage is set higher than that in the first stage, or a method in which heat treatment is carried out in one stage, but after the heat treatment, a mechanical crushing step is carried out while performing water cooling. The spatula angle of the polyethylene powder can be measured by the method described in the examples described later.

[Total of Magnesium, Titanium and Aluminum Element Contents]

In the polyethylene powder of the present embodiment, the total of magnesium, titanium and aluminum element contents, as measured by an inductively coupled plasma mass spectrometer (ICP/MS), is preferably 20 ppm or less, more preferably 18 ppm or less, and still more preferably 15 ppm or less. In the polyethylene powder of the present embodiment, the lower limit of the total of magnesium, titanium and aluminum element contents is not particularly limited, and is, for example, 0.1 ppm. When the total of magnesium, titanium and aluminum element contents in the polyethylene powder of the present embodiment is in this range, appearances of various molded bodies using the polyethylene powder as a starting material are improved, this leads to a decrease in a waste ratio arising from appearances, and the productivity can be enhanced. Regarding control of the total of magnesium, titanium and aluminum element contents in the polyethylene powder to the above range, it is possible to control it by, for example, productivity of the polyethylene powder per unit catalyst, and by increasing the productivity, the contents can be decreased. The total of magnesium, titanium and aluminum element contents in the polyethylene powder can be measured by the method described in the examples described later.

[Degree of Compression]

The degree of compression of the polyethylene powder of the present embodiment is preferably 20% or less, more preferably 19% or less, and still more preferably 18% or less. The lower limit of the degree of compression of the polyethylene powder of the present embodiment is not particularly limited, and is, for example, 5%. When the degree of compression of the polyethylene powder of the present embodiment is in this range, the degree of filling during the production of a compression molded body is enhanced, and therefore, protrusion from a mold is reduced, and the deterioration of productivity tends to be able to be improved. The production efficiency can be enhanced. It is also possible to control the degree of compression of the polyethylene powder by the slurry concentration in the polymerizer, and by increasing the slurry concentration, the degree of compression thereof can be increased. The degree of compression of the polyethylene powder can be measured by the method described in the examples described later.

The polyethylene powder of the present embodiment may be molded, as it is, by various molding machines, or may be molded by various molding machines after the polyethylene powder is mixed with an organic peroxide.

[Organic Peroxide]

The organic peroxide (organic peroxide crosslinking agent) that is used when the polyethylene powder of the present embodiment is molded is not particularly limited as long as it is an organic substance contributing to crosslinking of the ethylene-based polymer and having an atomic group —O—O— in a molecule, and examples thereof include organic peroxides, such as dialkyl peroxide, diacyl peroxide, hydroperoxide and ketone peroxide; organic peresters, such as alkyl perester; and peroxydicarbonate. Specific examples of the organic peroxides include, but are not limited to, dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butyl peroxyisopropyl carbonate, diacetyl peroxide, lauroyl peroxide, tert-butyl cumyl peroxide, and α,α'-di(tert-butylperoxy)diisopropylbenzene. Among these, 2,5-dimethyl-2,5-bis(t-butylperoxy)hexane (trade name "PERHEXA 25B" manufactured by NOF Corporation), 2,5-dimethyl-2,5-bis(t-butyperloxy)hexyne-3 (trade name "PERHEXYNE 25B" manufactured by NOF Corporation), dicumyl peroxide, and 1,1-bis(t-butylperoxy)-3,3,5-trimethylcyclohexane are preferable.

[Other Components]

The polyethylene powder of the present embodiment may be used in combination with various known additives, as needed. Examples of heat stabilizers include, but are not limited to, heat-resistant stabilizers, such as tetrakis[methylene(3,5-di-t-butyl-4-hydroxy)hydrocynnamate]methane and distearyl thiodipropionate; and weathering stabilizers, such as bis(2,2',6,6'-tetramethyl-4-piperidine)sebacate and 2-(2-hydroxy-t-butyl-5-methylphenyl)-5-chlorobenzotriazole. Moreover, stearates such as calcium stearate, magnesium stearate and zinc stearate, which are known as lubricants or hydrogen chloride absorbents, are also preferred additives.

[Method for Molding Polyethylene Powder]

Examples of methods for molding the polyethylene powder of the present embodiment include, but are not limited to, compression molding (press molding) and extrusion molding. The compression molding is a method in which the polyethylene powder as a starting material is homogeneously spread in a mold and heated and pressurized to mold the powder, and then the resulting molded body is cooled and taken out. A plate-like molded body can be used as a product, as it is, or a block can be prepared and then subjected to cutting or the like to prepare a final product. On the other hand, in the extrusion molding, a screw extruder, or a ram extruder for extruding a molded body by moving a piston back and forth is used. By changing a shape of an outlet of the extruder, molded bodies of various shapes such as sheet, flat plate, profile and pipe are obtained.

[Method for Producing Polyethylene Powder]

A method for producing the polyethylene powder of the present embodiment is not particularly limited, and is, for example, a method for producing the polyethylene powder using common Ziegler-Natta catalysts or metallocene catalysts. Particularly a method for producing the polyethylene powder using Ziegler-Natta catalysts is preferable. The Ziegler-Natta catalysts are disclosed in [0032] to [0068] of the aforesaid Patent Document 3.

When a solid catalyst component and an organometallic compound component (sometimes together referred to as a "catalyst" hereinafter) are added to the polymerization system under the ethylene-based polymerization conditions, they may be separately added to the polymerization system or may be added to the polymerization system after they are mixed in advance. The ratio between them combined is not particularly limited, and the amount of the organometallic compound component based on 1 g of the solid catalyst component is preferably 0.01 mmol or more and 1,000 mmol or less, more preferably 0.1 mmol or more and 500 mmol or less, and still more preferably 1 mmol or more and 100 mmol or less. Other purposes of mixing them include prevention of electrostatic adhesion to a storage tank, piping or the like.

The polymerization method in the method for producing the polyethylene powder is not particularly limited, and is, for example, a method in which ethylene or monomers containing ethylene and an α-olefin having 3 or more and 8 or less carbon atoms are (co)polymerized by a suspension polymerization method. Polymerization by the suspension polymerization method is preferable because heat of polymerization can be efficiently removed. In the suspension polymerization method, an inert hydrocarbon medium can be used as a medium, and an olefin itself can also be used as a solvent.

Specific examples of the inert hydrocarbon media include, but are not limited to, aliphatic hydrocarbons, such as propane, butane, isobutane, pentane, isopentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethyl chloride, chlorobenzene and dichloromethane; and mixtures of these.

In usual, the polymerization temperature in the method for producing the polyethylene powder of the present embodiment is preferably 20° C. or higher and 100° C. or lower, more preferably 30° C. or higher and 95° C. or lower, and still more preferably 40° C. or higher and 90° C. or lower. When the polymerization temperature is 20° C. or higher, industrially efficient production is feasible. On the other hand, when the polymerization temperature is 100° C. or lower, continuously stable operations are feasible.

In usual, the polymerization pressure in the method for producing the polyethylene powder of the present embodiment is preferably normal pressure or higher and 15 MPa or lower, more preferably 0.1 MPa or higher and 14 MPa or lower, and still more preferably 0.2 MPa or higher and 13 MPa or lower. When the polymerization pressure is normal pressure or higher, a polyethylene powder in which the total amount of metals and the total amount of chlorine are large tends to be obtained, and when the polymerization pressure is 13 MPa or lower, a polyethylene powder in which the total amount of metals and the total amount of chlorine are small tends to be stably produced.

It is also possible to carry out the polymerization in two or more stages different in reaction conditions. Moreover, the viscosity-average molecular weight of the resulting polyethylene powder can also be adjusted by allowing hydrogen to exist in the polymerization system or by changing the polymerization temperature, as described in, for example, West German Patent Application Publication No. 3127133. By adding hydrogen to the polymerization system as a chain transfer agent, it becomes possible to control the molecular weight in an appropriate range. When hydrogen is added to the polymerization system, the molar fraction of hydrogen is preferably 0.01 mol % or more and 30 mol % or less, more preferably 0.01 mol % or more and 25 mol % or less, and still more preferably 0.01 mol % or more and 20 mol % or less. In the present embodiment, other known components useful for producing the polyethylene powder can be contained in addition to such components as described above.

When polymerization for the polyethylene powder is generally carried out, it is also possible to use an antistatic agent such as STATSAFE 3000 manufactured by The Associated Octel Company Limited (agency: MARUWA BUSSAN K.K.) in order to inhibit electrostatic adhesion of a polymer to the polymerization reactor. As the STATSAFE 3000, dilute one obtained by diluting it with an inert hydrocarbon medium can be added to the polymerization reactor by a pump or the like. In this case, the addition amount is preferably 0.1 ppm or more and 50 ppm or less, and more preferably 20 ppm or more and 50 ppm or less, based on the production of the polyethylene powder per unit time.

A drying method for obtaining the polyethylene powder of the above range after the polymerization is preferably (i) a method in which two-stage heat treatment is carried out, mechanical stirring is carried out in the first stage, and the heat treatment temperature in the second stage is set higher than that in the first stage, or (ii) a method in which heat treatment is carried out in one stage, but after the heat treatment, a mechanical crushing step is carried out while performing water cooling. In the case of the method (i) in which two-stage heat treatment is carried out, the temperature of the heat treatment in the first stage is preferably 50° C. or higher and 110° C. or lower, and the temperature in the second stage is preferably higher than that in the first stage by 5° C. or higher. In this case, the dryer used for the heat treatment accompanied by mechanical stirring in the first stage is not particularly limited, and is preferably a dryer having stirring function, and is, for example, a paddle dryer. The paddle blade rotational speed of the paddle dryer is preferably 50 rpm or more and 150 rpm or less. The type of the dryer used for the heat treatment in the second stage is not particularly limited, and is preferably rotary kiln type, paddle type, drum type, a fluidized bed dryer or the like.

Regarding the time of the two-stage heat treatment, the time of the heat treatment in the first stage is preferably 1 hour or more and 3 hours or less, and the time thereof in the second stage is preferably 3 hours or more and 5 hours or less. In the case of the method (ii) in which the heat treatment is carried out in one stage, the temperature of the heat treatment is preferably 50° C. or higher and 110° C. or lower, the type of the dryer is preferably rotary kiln type, paddle type, drum type, a fluidized bed dryer or the like, and the heat treatment time is preferably 3 hours or more and 6 hours or less. When mechanical crushing is carried out while performing water cooling after the heat treatment, it is preferable to use a Henschel mixer equipped with a water-cooling jacket of 25° C. or lower though it is not particularly limited, and the linear velocity of the stirring blade tip is preferably 15 m/sec or more and 25 m/sec or less, and the stirring time is preferably 5 minutes or more and 20 minutes or less. It is also effective to introduce an inert gas such as nitrogen to the dryer to accelerate drying.

By the drying, friction between the polyethylene powder particles can be adjusted.

[Use Application]

The polyethylene powder of the present embodiment can possess a high level of processability and high continuous processing productivity, and can be processed by various processing methods. A molded body using the polyethylene powder of the present embodiment can be applied to various uses. Examples of main uses to which the molded body is preferably applied include microporous membranes (e.g., separators for secondary batteries such as lithium-ion secondary batteries and lead storage batteries), fibers, lining materials for hoppers, chutes, and the like because of non-tackiness and low friction coefficient, and bearings, gears, roller guide rails, bone substitutes, bone conductive materials or osteoinductive materials, which require self-lubricating properties, low friction coefficient and abrasion resistance.

EXAMPLES

Hereinafter, the present invention will be described in more detail with reference to examples and comparative examples, but the present invention is in no way limited to the following examples.

[Measuring Methods and Conditions]

(1) Average Particle Diameter (D50)

The average particle diameter (D50) of the polyethylene powder was measured by using a laser diffraction particle size distribution measuring device SALD-2300 (manufactured by Shimadzu Corporation). As the dispersion medium, methanol was used, and as the dispersing device, an ultrasonic bath was used.

(2) Powder Spreading Parameter

The powder spreading parameter of the polyethylene powder was determined by the method shown below. A funnel having a damper at its lower opening in a bulk specific gravity measuring device described in JIS K6720-2 was used, and the funnel was vertically kept in such a manner that the lower opening was positioned 55 mm above an iron plate of 300 mm square on which a polyethylene terephthalate film having a thickness of 100 μm had been placed. The damper of the lower opening of the funnel was closed, and 30 g of a polyethylene powder was introduced thereinto. The damper was quickly pulled out to allow 30 g of the polyethylene powder to freely fall on the iron plate on which a polyethylene terephthalate film having a thickness of 100 μm had been placed. Diameters (mm) at three points in the largest pile of the polyethylene powder obtained by the free fall (powder not in contact with the pile was not included) were measured, and an average value of them was taken as a diameter A. On the pile, a polyethylene terephthalate film having a thickness of 100 μm was quietly placed, and an iron plate of 300 mm square was further placed thereon. The iron plate having the pile therebetween was quietly introduced in a press machine, and the powder pile was compressed at a pressure of 1 MPa for 5 minutes. The powder pile with the iron plate was quietly taken out, the iron plate and the polyethylene terephthalate (PET) film placed on the pile were quietly removed, then the diameters (mm) at three points in the pile obtained after compression were measured, and an average value of them was taken as a diameter B. In this measurement, the temperature and the humidity in the ambient environment were set to 23° C. and 50 RH %, respectively. A ratio of the diameter B obtained above to the diameter A obtained above (B/A) was defined as the powder spreading parameter (with the proviso that the significant digits were 2 digits).

(3) Viscosity-Average Molecular Weight (Mv)

The viscosity-average molecular weight of the polyethylene powder was determined by the method shown below in accordance with ISO 1628-3 (2010). First, 20 mg of the polyethylene powder was weighed into a melting tube, the melting tube was purged with nitrogen, then 20 mL of decahydronaphthalene (to which 1 g/L of 2,6-di-t-butyl-4-methylphenol had been added) was added, and they were stirred at 150° C. for 2 hours to dissolve the polyethylene powder. In a constant temperature bath at 135° C., a fall time (ts) of the solution between marked lines was measured using a Cannon-Fenske viscometer (product of SIBATA SCIENTIFIC TECHNOLOGY LTD., Product No. 100). Also, regarding each of samples in which the amount of the polyethylene powder had been changed to 10 mg, 5 mg and 2.5 mg, a fall time (ts) between marked lines was measured similarly to the above. A fall time (tb) of only decahydronaphthalene containing no polyethylene powder, as a blank, was measured. Reduced viscosities (ηsp/C) of the polyethylene powders determined in accordance with the following Expression A were each plotted to derive a linear expression of the concentration (C) (unit: g/dL) and the reduced viscosity (ηsp/C) of the polyethylene powder, and an intrinsic viscosity ([η]) given by extrapolation to the concentration 0 was determined.

$$\eta sp/C = (ts/tb - 1)/0.1 (\text{unit: dL/g}) \quad \text{Expression A}$$

Next, using the value of the above intrinsic viscosity [η], a viscosity-average molecular weight (Mv) was calculated in accordance with the following Expression B.

$$Mv = (5.34 \times 10^4) \times [\eta]^{1.49} \quad \text{Expression B}$$

(4) Apparent Density (Bulk Density)

The apparent density of the polyethylene powder was measured in accordance with the JIS K-6722 method.

(5) Spatula Angle, and Difference in Spatula Angle Between Before and After Collapse (Before Collapse–After Collapse)

The spatula angle of the polyethylene powder, and the spatula angles before and after collapse were measured using a powder tester (model: PT-X, manufactured by HOSOKAWA MICRON CORPORATION).

(6) Total of Magnesium, Titanium and Aluminum Element Contents

The total of magnesium, titanium and aluminum element contents in the polyethylene powder was calculated as follows. Using a microwave decomposition device (model: ETHOS TC, manufactured by Milestone General K.K.), the polyethylene powder was pressure decomposed, then element concentrations of magnesium, titanium and aluminum as metals in the polyethylene powder were measured by an internal standard method using ICP-MS (inductively coupled plasma mass spectrometer, model: X Series X7, manufactured by Thermo Fisher Scientific), and the sum of them was calculated.

(7) Degree of Compression

The degree of compression of the polyethylene powder was measured using a powder tester (model: PT-X, manufactured by HOSOKAWA MICRON CORPORATION).

(8) Level of Defectiveness of Molded Article

In a mold of 1 m square and a height of 3 cm in a hot press molding machine, 28 kg of the polyethylene powder was introduced in a state of free fall, then compression molded at a preset temperature of 210° C. and a gauge pressure of 10 MPa for 12 hours, and thereafter subjected to cooling process for terminating heating while keeping the pressure, thereby obtaining a molded article. The molded article obtained was cut into bodies of 20 cm square, and a weight (a) of a 20 cm square cut molded body located at the center of the 1 m square article and an average value (b) of weights of four 20 cm square cut molded bodies located at the edge portions were compared. The judgement criteria are as follows.

◯: b/a is 0.98 or more.

Δ: b/a is 0.95 or more and less than 0.98.

X: b/a is less than 0.95.

(9) Appearance of Molded Article

The surface state of the 20 cm square cut molded body obtained by the above method was visually evaluated. The judgement criteria are as follows.

◯: Foreign matters cannot be confirmed by a ×5 magnifying glass.

Δ: Foreign matters can be confirmed by a ×5 magnifying glass, but they cannot be confirmed with the naked eye.

X: Foreign matters can be confirmed with the naked eye.

(10) Protrusion of Molded Body from Mold

When a molded body was obtained in the same manner as in (8), a weight of the molded body protruding from the mold was measured. The judgement criteria are as follows.

◯: The weight is less than 100 g.

Δ: The weight is 100 g or more and less than 150 g.

X: The weight is 150 g or more.

[Catalyst Synthesis Example 1: Preparation of Solid Catalyst Component [A]]

(1) Synthesis of Carrier (A-1)

In an 8 L stainless steel autoclave having been thoroughly purged with nitrogen, 1,000 mL of a hexane solution of hydroxy trichlorosilane of 2 mol/L was introduced, and while stirring at 65° C., 2,550 mL (equivalent to 2.68 mol in terms of magnesium) of a hexane solution of an organomagnesium compound represented by the composition formula $AlMg_5(C_4H_9)_{11}(OC_4H_9)_2$ was dropwise added over a period of 4 hours, and further, the reaction was continued at 65° C. for 1 hour while stirring. After the reaction was completed, a supernatant was removed, and the remainder was washed with 1,800 mL of hexane four times, thereby obtaining a solid. As a result of analysis of this solid (carrier (A-1)), the amount of magnesium contained per 1 g of the solid was 8.31 mmol.

(2) Preparation of Solid Catalyst Component [A]

To 1,970 mL of a hexane slurry containing 110 g of the carrier (A-1), 110 mL of a titanium tetrachloride hexane solution of 1 mol/L and 110 mL of a hexane solution of an organomagnesium compound represented by the composition formula AlMg$_5$(C$_4$H$_9$)$_{11}$(OSiH)$_2$ of 1 mol/L were simultaneously added over a period of 1 hour, while stirring at 10° C. After the addition, the reaction was continued at 10° C. for 1 hour. After the reaction was completed, 1,100 mL of a supernatant was removed, and the remainder was washed with 1,100 mL of hexane twice, thereby preparing a solid catalyst component [A]. The amount of titanium contained in 1 g of this solid catalyst component [A] was 0.75 mmol.

[Production of Polyethylene Powder]

To a Bessel type 300 L polymerization reactor equipped with a stirrer, hexane, ethylene, an α-olefin, hydrogen, catalysts, and STATSAFE 3000 (manufactured by The Associated Octel Company Limited) were continuously fed under the conditions set forth in Tables 1 to 3, and polyethylene powders were produced as follows.

Example 1: PE-1

By continuously feeding ethylene to the polymerization reactor and polymerizing ethylene in the following manner, a polyethylene powder was produced. The polymerization temperature was kept at 74° C. by jacket cooling. Hexane was fed to the polymerization reactor at 55 L/hour. As the catalysts, a mixture of triisobutylaluminum and diisobutylaluminum hydride that were cocatalyst components, and the solid catalyst component [A] were used. The solid catalyst component [A] was added to the polymerization reactor at a rate of 0.7 g/hour, and the mixture of triisobutylaluminum and diisobutylaluminum hydride was added to the polymerization reactor at a rate of 9 mmol/hour. The solid catalyst component [A] and the mixture of triisobutylaluminum and diisobutylaluminum hydride were added to the polymerization reactor in equal amounts so that the rate might become 5 L/hour. Likewise, STATSAFE 3000 was added to the polymerization reactor in such a manner that the concentration thereof based on the polyethylene powder became 25 ppm. Hydrogen was continuously added to the polymerization reactor in such a manner that the hydrogen concentration became 0.2 mol % based on the gas phase ethylene concentration. The polymerization pressure was kept at 0.4 MPa by continuously feeding ethylene to the polymerization reactor. Under these conditions, stirring was sufficiently carried out so that the contents in the polymerization reactor might become homogenous. The production rate of the polyethylene powder was 10 kg/hour. The catalytic activity was 30,000 g-PE/g-solid catalyst component [A].

Next, the polymer slurry of the polyethylene powder was heat-treated (heat treatment conditions A) as follows. The polymer slurry of the polyethylene powder was continuously drawn out into a flash drum having a pressure of 0.05 MPa so that the level in the polymerization reactor might be kept constant, and thereafter, the slurry was transferred to a paddle dryer, dried at a paddle blade rotational speed of 100 rpm and a jacket temperature of 60° C. for 1.5 hours, and then dried by a drum dryer at a drum rotational speed of 5 rpm and a jacket temperature of 70° C. for 4 hours without providing a stirrer such as a paddle, thereby obtaining a polyethylene powder.

Using a sieve having an opening of 425 μm, particles of the resulting polyethylene powder, which had not passed through the sieve, were removed. The results of evaluation of the thus obtained polyethylene powder (PE-1) by the aforesaid methods are set forth in Table 1.

Example 2

The same operations as in Example 1 were carried out except that before the classification by a sieve having an opening of 425 μm, calcium stearate (manufactured by DAINICHI CHEMICAL INDUSTRY CO., LTD., C60) was mixed in such a manner that the concentration became 3,000 ppm based on the polyethylene powder, using a Henschel mixer at a stirring blade tip linear velocity of 18 m/sec for 10 minutes. The results of evaluation of the thus obtained polyethylene powder (PE-2) by the aforesaid methods are set forth in Table 1.

Example 3

The same operations as in Example 1 were carried out except that as the α-olefin, 1-butene was continuously added to the polymerization reactor in such a manner that the 1-butene concentration became 0.4 mol % based on the gas phase ethylene concentration. The results of evaluation of the thus obtained polyethylene powder (PE-3) by the aforesaid methods are set forth in Table 1.

Example 4

The same operations as in Example 3 were carried out except that before the classification by a sieve having an opening of 425 μm, calcium stearate (manufactured by DAINICHI CHEMICAL INDUSTRY CO., LTD., C60) was mixed in such a manner that the concentration became 3,000 ppm based on the polyethylene powder, using a Henschel mixer at a stirring blade tip linear velocity of 18 m/sec for 10 minutes. The results of evaluation of the thus obtained polyethylene powder (PE-4) by the aforesaid methods are set forth in Table 1.

Example 5

The same operations as in Example 1 were carried out except that the polymerization temperature was kept at 80° C., hydrogen was continuously added to the polymerization reactor in such a manner that the hydrogen concentration became 0.05 mol % based on the gas phase ethylene concentration, and the polymerization pressure was kept at 0.6 MPa. The results of evaluation of the thus obtained polyethylene powder (PE-5) by the aforesaid methods are set forth in Table 1.

Example 6

The same operations as in Example 1 were carried out except that the polymerization temperature was kept at 67° C., hydrogen was continuously added to the polymerization reactor in such a manner that the hydrogen concentration became 0.25 mol % based on the gas phase ethylene concentration, and the polymerization pressure was kept at 0.3 MPa. The results of evaluation of the thus obtained polyethylene powder (PE-6) by the aforesaid methods are set forth in Table 1.

Example 7

The same operations as in Example 1 were carried out except that the polymerization temperature was kept at 93° C., hydrogen was continuously added to the polymerization reactor in such a manner that the hydrogen concentration became 11 mol % based on the gas phase ethylene concentration, and the polymerization pressure was kept at 0.6 MPa. The results of evaluation of the thus obtained polyethylene powder (PE-7) by the aforesaid methods are set forth in Table 1.

Example 8

The same operations as in Example 7 were carried out except that the polymerization temperature was kept at 95° C., and hydrogen was continuously added to the polymerization reactor in such a manner that the hydrogen concentration became 11.5 mol % based on the gas phase ethylene concentration. The results of evaluation of the thus obtained polyethylene powder (PE-8) by the aforesaid methods are set forth in Table 2.

Example 9

The same operations as in Example 1 were carried out except that the polymerization temperature was kept at 43° C., hydrogen was not added, and the polymerization pressure was kept at 0.28 MPa. The results of evaluation of the thus obtained polyethylene powder (PE-9) by the aforesaid methods are set forth in Table 2.

Example 10

The same operations as in Example 9 were carried out except that the polymerization temperature was kept at 40° C. The results of evaluation of the thus obtained polyethylene powder (PE-10) by the aforesaid methods are set forth in Table 2.

Example 11

The same operations as in Example 1 were carried out except that the polymerization pressure was kept at 0.22 MPa. The results of evaluation of the thus obtained polyethylene powder (PE-11) by the aforesaid methods are set forth in Table 2.

Example 12

The same operations as in Example 1 were carried out except that the heat treatment conditions for the polymer slurry of the polyethylene powder were changed to the conditions (heat treatment conditions B) that the polymer slurry of the polyethylene powder was drawn out into a flash drum, and thereafter, the slurry was transferred to a paddle dryer, dried at a paddle blade rotational speed of 100 rpm and a jacket temperature of 60° C. for 5.5 hours, and then stirred using a Henschel mixer equipped with a water-cooling jacket of 20° C. at a stirring blade tip linear velocity of 18 m/sec for 10 minutes. The results of evaluation of the thus obtained polyethylene powder (PE-12) by the aforesaid methods are set forth in Table 2.

Example 13

The same operations as in Example 12 were carried out except that in the stirring using a Henschel mixer, calcium stearate (manufactured by DAINICHI CHEMICAL INDUSTRY CO., LTD., C60) was mixed in such a manner that the concentration became 3,000 ppm based on the polyethylene powder. The results of evaluation of the thus obtained polyethylene powder (PE-13) by the aforesaid methods are set forth in Table 2.

Comparative Example 1

The same operations as in Example 1 were carried out except that the heat treatment conditions for the polymer slurry of the polyethylene powder were changed to the conditions (heat treatment conditions C) that the polymer slurry of the polyethylene powder was drawn out into a flash drum, the slurry was not transferred to a paddle dryer, and the slurry was dried by a drum dryer at a drum rotational speed of 5 rpm and a jacket temperature of 70° C. for 5.5 hours without providing a stirrer such as a paddle, and in addition, the polymerization temperature was set to 73° C., and when hydrogen was continuously added to the polymerization reactor, the concentration (hydrogen gas phase concentration) was adjusted to 0.18 mol % based on the gas phase ethylene concentration. The results of evaluation of the thus obtained polyethylene powder (PE-14) by the aforesaid methods are set forth in Table 3.

Comparative Example 2

The same operations as in Comparative Example 1 were carried out except that before the classification by a sieve having an opening of 425 μm, calcium stearate (manufactured by DAINICHI CHEMICAL INDUSTRY CO., LTD., C60) was mixed in such a manner that the concentration became 3,000 ppm based on the polyethylene powder, using a Henschel mixer at a stirring blade tip linear velocity of 18 m/sec for 10 minutes. The results of evaluation of the thus obtained polyethylene powder (PE-15) by the

Comparative Example 3

The same operations as in Comparative Example 1 were carried out except that as the α-olefin, 1-butene was continuously added to the polymerization reactor in such a manner that the 1-butene concentration became 0.4 mol % based on the gas phase ethylene concentration. The results of evaluation of the thus obtained polyethylene powder (PE-16) by the aforesaid methods are set forth in Table 3.

Comparative Example 4

The same operations as in Comparative Example 3 were carried out except that before the classification by a sieve having an opening of 425 μm, calcium stearate (manufactured by DAINICHI CHEMICAL INDUSTRY CO., LTD., C60) was mixed in such a manner that the concentration became 3,000 ppm based on the polyethylene powder, using a Henschel mixer at a stirring blade tip linear velocity of 18 m/sec for 10 minutes. The results of evaluation of the thus obtained polyethylene powder (PE-17) by the aforesaid methods are set forth in Table 3.

Comparative Example 5

The same operations as in Comparative Example 1 were carried out except that the polymerization temperature was kept at 80° C., hydrogen was continuously added to the polymerization reactor in such a manner that the hydrogen gas phase concentration became 0.06 mol % based on the gas phase ethylene concentration, and the polymerization pressure was kept at 0.64 MPa. The results of evaluation of the thus obtained polyethylene powder (PE-18) by the aforesaid methods are set forth in Table 3.

Comparative Example 6

The same operations as in Comparative Example 1 were carried out except that the polymerization temperature was kept at 63° C., hydrogen was continuously added to the polymerization reactor in such a manner that the hydrogen gas phase concentration became 0.22 mol % based on the gas phase ethylene concentration, and the polymerization pressure was kept at 0.15 MPa. The results of evaluation of the thus obtained polyethylene powder (PE-19) by the aforesaid methods are set forth in Table 3.

TABLE 1

|  | Ex. 1 PE-1 | Ex. 2 PE-2 | Ex. 3 PE-3 | Ex. 4 PE-4 | Ex. 5 PE-5 | Ex. 6 PE-6 | Ex. 7 PE-7 |
|---|---|---|---|---|---|---|---|
| Polymerization temperature (° C.) | 74 | 74 | 74 | 74 | 80 | 67 | 93 |
| α-Olefin | none | none | 1-butene | 1-butene | none | none | none |
| α-Olefin gas phase concentration (mol %) | 0 | 0 | 0.4 | 0.4 | 0 | 0 | 0 |
| Hydrogen gas phase concentration (mol %) | 0.2 | 0.2 | 0.2 | 0.2 | 0.05 | 0.25 | 11 |
| Polymerization pressure (MPa) | 0.4 | 0.4 | 0.4 | 0.4 | 0.6 | 0.3 | 0.6 |
| Addition amount of STATSAFE 3000 (ppm) | 25 | 25 | 25 | 25 | 25 | 25 | 25 |
| Addition amount of calcium stearate (ppm) | 0 | 3,000 | 0 | 3,000 | 0 | 0 | 0 |
| Heat treatment conditions | A | A | A | A | A | A | A |
| Average particle diameter (D50) (μm) | 95 | 100 | 93 | 98 | 148 | 35 | 110 |
| Powder spreading parameter | 1.9 | 1.8 | 1.9 | 1.8 | 2.0 | 1.8 | 2.0 |
| Viscosity-average molecular weight (Mv) (ten thousand(s)) | 335 | 335 | 340 | 340 | 300 | 400 | 15 |
| Bulk density (g/mL) | 0.45 | 0.50 | 0.44 | 0.49 | 0.51 | 0.40 | 0.47 |
| Spatula angle (degree(s)) | 50 | 40 | 49 | 41 | 55 | 32 | 58 |
| Difference in spatula angle between before and after collapse (degree(s)) | 16 | 17 | 17 | 14 | 10 | 11 | 20 |
| Total of magnesium, titanium and aluminum element contents (ppm) | 10 | 13 | 11 | 14 | 8 | 15 | 8 |
| Degree of compression (%) | 17 | 10 | 17 | 11 | 16 | 16 | 17 |
| Level of defectiveness of molded article | ○ | ○ | ○ | ○ | ○ | ○ | ○ |
| Appearance of molded article | ○ | ○ | ○ | ○ | ○ | ○ | ○ |
| Protrusion of molded body from mold | ○ | ○ | ○ | ○ | ○ | ○ | ○ |

TABLE 2

|  | Ex. 8 PE-8 | Ex. 9 PE-9 | Ex. 10 PE-10 | Ex. 11 PE-11 | Ex. 12 PE-12 | Ex. 13 PE-13 |
|---|---|---|---|---|---|---|
| Polymerization temperature (° C.) | 95 | 43 | 40 | 74 | 74 | 74 |
| α-Olefin | none | none | none | none | none | none |
| α-Olefin gas phase concentration (mol %) | 0 | 0 | 0 | 0 | 0 | 0 |
| Hydrogen gas phase concentration (mol %) | 11.5 | 0 | 0 | 0.2 | 0.2 | 0.2 |
| Polymerization pressure (MPa) | 0.6 | 0.28 | 0.28 | 0.22 | 0.4 | 0.4 |
| Addition amount of STATSAFE 3000 (ppm) | 25 | 25 | 25 | 25 | 25 | 25 |
| Addition amount of calcium stearate (ppm) | 0 | 0 | 0 | 0 | 0 | 3,000 |
| Heat treatment conditions | A | A | A | A | B | B |
| Average particle diameter (D50) (μm) | 115 | 80 | 75 | 105 | 90 | 90 |
| Powder spreading parameter | 2.1 | 1.8 | 1.6 | 2.1 | 1.9 | 1.9 |
| Viscosity-average molecular weight (Mv) (ten thousand(s)) | 9.1 | 978 | 1,053 | 340 | 335 | 340 |
| Bulk density (g/mL) | 0.48 | 0.41 | 0.39 | 0.48 | 0.46 | 0.44 |
| Spatula angle (degree(s)) | 61 | 47 | 45 | 52 | 46 | 38 |
| Difference in spatula angle between before and after collapse (degree(s)) | 26 | 18 | 18 | 18 | 15 | 12 |
| Total of magnesium, titanium and aluminum element contents (ppm) | 7 | 17 | 17 | 24 | 14 | 15 |
| Degree of compression (%) | 15 | 18 | 18 | 21 | 18 | 13 |
| Level of defectiveness of molded article | Δ | ○ | Δ | ○ | ○ | ○ |
| Appearance of molded article | ○ | ○ | ○ | Δ | ○ | ○ |
| Protrusion of molded body from mold | Δ | ○ | Δ | Δ | ○ | ○ |

TABLE 3

|  | Comp. Ex. 1 PE-14 | Comp. Ex. 2 PE-15 | Comp. Ex. 3 PE-16 | Comp. Ex. 4 PE-17 | Comp. Ex. 5 PE-18 | Comp. Ex. 6 PE-19 |
|---|---|---|---|---|---|---|
| Polymerization temperature (° C.) | 73 | 73 | 73 | 73 | 80 | 63 |
| α-Olefin | none | none | 1-butene | 1-butene | none | none |
| α-Olefin gas phase concentration (mol %) | 0 | 0 | 0.4 | 0.4 | 0 | 0 |
| Hydrogen gas phase concentration (mol %) | 0.18 | 0.18 | 0.18 | 0.18 | 0.06 | 0.22 |
| Polymerization pressure (MPa) | 0.4 | 0.4 | 0.4 | 0.4 | 0.64 | 0.15 |
| Addition amount of STATSAFE 3000 (ppm) | 25 | 25 | 25 | 25 | 25 | 25 |
| Addition amount of calcium stearate (ppm) | 0 | 3,000 | 0 | 3,000 | 0 | 0 |
| Heat treatment conditions | C | C | C | C | C | C |
| Average particle diameter (D50) (μm) | 88 | 96 | 93 | 97 | 153 | 28 |
| Powder spreading parameter | 1.4 | 1.4 | 1.4 | 1.4 | 2.2 | 1.4 |
| Viscosity-average molecular weight (Mv) (ten thousand(s)) | 340 | 338 | 342 | 340 | 294 | 440 |

TABLE 3-continued

|  | Comp. Ex. 1 PE-14 | Comp. Ex. 2 PE-15 | Comp. Ex. 3 PE-16 | Comp. Ex. 4 PE-17 | Comp. Ex. 5 PE-18 | Comp. Ex. 6 PE-19 |
|---|---|---|---|---|---|---|
| Bulk density (g/mL) | 0.38 | 0.41 | 0.35 | 0.39 | 0.52 | 0.38 |
| Spatula angle (degree(s)) | 61 | 45 | 42 | 29 | 62 | 29 |
| Difference in spatula angle between before and after collapse (degree(s)) | 12 | 9 | 13 | 9 | 26 | 8 |
| Total of magnesium, titanium and aluminum element contents (ppm) | 16 | 18 | 17 | 21 | 13 | 26 |
| Degree of compression (%) | 19 | 13 | 20 | 15 | 14 | 22 |
| Level of defectiveness of molded article | X | X | X | X | X | X |
| Appearance of molded article | ○ | ○ | ○ | Δ | ○ | X |
| Protrusion of molded body from mold | X | X | X | X | X | X |

From the evaluation results set forth in Tables 1 to 3, it has been proved that the polyethylene powders of the examples can simultaneously achieve improvement in filling failure at the edge portions of a molded body and improvement in noneconomic efficiency and deterioration of productivity due to excessive filling of a polyethylene powder, and can provide molded bodies having good appearance.

The present application is based on Japanese patent application (Japanese Patent Application No. 2019-028209) filed on Feb. 20, 2019, and the contents thereof are incorporated herein by reference.

INDUSTRIAL APPLICABILITY

The polyethylene powder of the present invention is preferably applied for lining materials for hoppers, chutes, and the like because of non-tackiness and low friction coefficient, bearings, gears, roller guide rails, bone substitutes, bone conductive materials or osteoinductive materials, which require self-lubricating properties, low friction coefficient and abrasion resistance, separators for secondary batteries such as lithium-ion secondary batteries and lead storage batteries, fibers, etc.

The invention claimed is:

1. A polyethylene powder having an average particle diameter (D50) of 30 μm or more and 150 μm or less and a powder spreading parameter, as defined by the following method, of 1.8 or more and 2.0 or less:
    method: when a diameter of a powder pile obtained by allowing 30 g of a polyethylene powder to freely fall from the position of a height of 55 mm on an iron plate with a polyethylene terephthalate film having a thickness of 100 μm placed thereon, using a funnel having a damper at its lower opening in a bulk specific gravity measuring device described in JIS K6720-2 is represented by A, and a diameter of a powder pile obtained after the powder pile having been obtained by allowing 30 g of the polyethylene powder to freely fall is compressed at a pressure of 1 MPa is represented by B, a ratio of B to A (B/A) is defined as a powder spreading parameter.

2. The polyethylene powder according to claim 1, having a viscosity-average molecular weight of 100,000 or more and 10,000,000 or less.

3. The polyethylene powder according to claim 1, having an apparent density of 0.30 g/mL or more and 0.60 g/mL or less.

4. The polyethylene powder according to claim 1, wherein a spatula angle of the polyethylene powder is 30 degrees or more and less than 60 degrees, and a difference in spatula angle between before and after collapse (before collapse–after collapse) is 10 degrees or more and less than 25 degrees.

5. The polyethylene powder according to claim 1, wherein a total of magnesium, titanium and aluminum element contents as measured by an inductively coupled plasma mass spectrometer (ICP/MS) is 20 ppm or less.

6. The polyethylene powder according to claim 1, having a degree of compression of 20% or less.

7. A compression molded body obtained by molding the polyethylene powder according to claim 1.

8. An extrusion molded body obtained by molding the polyethylene powder according to claim 1.

9. A stretch molded body obtained by molding the polyethylene powder according to claim 1.

10. A microporous membrane obtained by molding the polyethylene powder according to claim 1.

11. A fiber obtained by molding the polyethylene powder according to claim 1.

12. The polyethylene powder according to claim 2, having an apparent density of 0.30 g/mL or more and 0.60 g/mL or less.

13. The polyethylene powder according to claim 2, wherein a spatula angle of the polyethylene powder is 30 degrees or more and less than 60 degrees, and a difference in spatula angle between before and after collapse (before collapse–after collapse) is 10 degrees or more and less than 25 degrees.

14. The polyethylene powder according to claim 3, wherein a spatula angle of the polyethylene powder is 30 degrees or more and less than 60 degrees, and a difference in spatula angle between before and after collapse (before collapse–after collapse) is 10 degrees or more and less than 25 degrees.

15. The polyethylene powder according to claim 12, wherein a spatula angle of the polyethylene powder is 30 degrees or more and less than 60 degrees, and a difference in spatula angle between before and after collapse (before collapse–after collapse) is 10 degrees or more and less than 25 degrees.

* * * * *